US009731762B2

(12) United States Patent
Hass et al.

(10) Patent No.: US 9,731,762 B2
(45) Date of Patent: Aug. 15, 2017

(54) CONTROL UNIT AND METHOD FOR AN EMERGENCY STEERING SUPPORT FUNCTION

(71) Applicant: TRW AUTOMOTIVE GMBH, Aldforf (DE)

(72) Inventors: Carsten Hass, Duesseldorf (DE); Torsten Bertram, Duesseldorf (DE); Martin Keller, Dortmund (DE)

(73) Assignee: TRW Automotive GmbH (DE)

( * ) Notice: Subject to any disclaimer, the term of this patent is extended or adjusted under 35 U.S.C. 154(b) by 66 days.

(21) Appl. No.: 14/895,226

(22) PCT Filed: May 12, 2014

(86) PCT No.: PCT/EP2014/059618
§ 371 (c)(1),
(2) Date: Dec. 2, 2015

(87) PCT Pub. No.: WO2014/195087
PCT Pub. Date: Dec. 11, 2014

(65) Prior Publication Data
US 2016/0280265 A1    Sep. 29, 2016

(30) Foreign Application Priority Data
Jun. 3, 2013    (DE) .................. 10 2013 009 2523

(51) Int. Cl.
*B60W 30/09*    (2012.01)
*B62D 15/02*    (2006.01)
*B60W 50/00*    (2006.01)

(52) U.S. Cl.
CPC ......... *B62D 15/0265* (2013.01); *B60W 30/09* (2013.01); *B60W 2050/0009* (2013.01);
(Continued)

(58) Field of Classification Search
None
See application file for complete search history.

(56) References Cited

U.S. PATENT DOCUMENTS 5,955,856 A * 9/1999 Sato .................. G05B 19/4105
                                                   318/560
6,694,233 B1 * 2/2004 Duff .................... G05D 1/0246
                                                    340/988
(Continued)

FOREIGN PATENT DOCUMENTS

DE    102004008894    9/2005
DE    102005006966    9/2005
(Continued)

OTHER PUBLICATIONS

Article entitled "Real-Time Trajectory Generation for Car-like Vehicles Navigating Dynamic Environments", May 2009, pp. 3401-3406.
(Continued)

Primary Examiner — Shelley Chen
(74) Attorney, Agent, or Firm — Tarolli, Sundheim, Covell & Tummino LLP (57) ABSTRACT

A control device for a land vehicle is described. The control device is set up to control at least one actuator of the land vehicle on the basis of an avoidance trajectory calculated by the control device in order to support a driver of the land vehicle during an evasive maneuver. The control device is also set up to receive sensor signals of at least one sensor; to generate an environmental model from the received sensor signals; to determine the position of an object relative to a current position of the land vehicle in the generated environmental model; and to calculate a preliminary avoidance trajectory. In the calculation of the preliminary avoidance trajectory, the current position of the land vehicle in the generated environmental model constitutes the starting point
(Continued)

of the preliminary avoidance trajectory. A preliminary end point of the preliminary avoidance trajectory is determined on the basis of the determined position of the object. To determine the parameters of the preliminary avoidance trajectory, at least the coordinates of the starting point and of the preliminary end point are used.

12 Claims, 6 Drawing Sheets

(52) U.S. Cl.
CPC . *B60W 2510/207* (2013.01); *B60W 2520/125* (2013.01); *B60W 2520/14* (2013.01); *B60W 2520/20* (2013.01); *B60W 2540/18* (2013.01); *B60W 2550/10* (2013.01); *B60W 2710/202* (2013.01); *B60W 2710/207* (2013.01); *B60W 2720/14* (2013.01)

(56) References Cited

U.S. PATENT DOCUMENTS

| | | | | |
|---|---|---|---|---|
| 6,975,246 | B1* | 12/2005 | Trudeau | B60T 7/22 180/167 |
| 9,318,023 | B2* | 4/2016 | Moshchuk | G08G 1/167 |
| 2006/0111819 | A1* | 5/2006 | Servera Serapio | B60R 1/00 701/28 |
| 2010/0259066 | A1* | 10/2010 | Haberl | B60J 7/1265 296/108 |
| 2011/0004375 | A1* | 1/2011 | Hueger | B62D 15/0285 701/41 |
| 2011/0106361 | A1 | 5/2011 | Staempfle et al. | |
| 2013/0054128 | A1* | 2/2013 | Moshchuk | G08G 1/167 701/301 |
| 2014/0074388 | A1* | 3/2014 | Bretzigheimer | B60T 1/10 701/117 |
| 2014/0236482 | A1* | 8/2014 | Dorum | G01C 21/34 701/533 |
| 2015/0097661 | A1* | 4/2015 | Nilsson | B62D 15/029 340/439 |
| 2015/0307125 | A1* | 10/2015 | Kunihiro | B62D 5/008 701/42 |

FOREIGN PATENT DOCUMENTS

| | | |
|---|---|---|
| DE | 102008013988 | 9/2008 |
| DE | 102011012784 | 3/2012 |
| DE | 102012007127 | 3/2013 |
| WO | 2007031578 | 3/2007 |
| WO | 2008031662 | 3/2008 |
| WO | 2010028629 | 3/2010 |

OTHER PUBLICATIONS

Article entitled "Vehicle Guidance for an Autonomous Vehicle", Oct. 1999., pp. 429-434.

Article entitled "Bezier Curve Based Path Planning for Autonomous Vehicle in Urban Environment", Jun. 2010, pp. 1036-1042.

Kehl, Steffen: Querregelung eines Versuchsfahrezeugs entlang vorgegebener Bahnen, D 93 (Diss, Universität Stuttgart), Shaker Verlag 2007.

Keller, Martin: Beschreibung von Ausweichtrajektorien für eine Bahnfolgeregelung, Diplomarbeit Technischi Universität Dortrnund, 2011.

* cited by examiner

CONTROL UNIT AND METHOD FOR AN EMERGENCY STEERING SUPPORT FUNCTION

RELATED APPLICATIONS

This application corresponds to PCT/EP2014/059618, filed May 12, 2014, which claims the benefit of German Application No. 10 2013 009 252.3, filed Jun. 3, 2013, the subject matter, of which are incorporated herein by reference in their entirety.

BACKGROUND OF THE INVENTION

A control device and a method for an emergency steering support function of a land vehicle are described. In particularly, a control device and a method for calculating an avoidance trajectory are described.

Systems are known from the prior art that activate the brakes of a vehicle in critical driving situations in order to avoid a collision with an obstacle or in order to at least reduce the collision speed. Since the length of the braking distance rises disproportionally with increasing speed, emergency braking systems have the drawback that they cannot always prevent a collision, for example in the event of a large differential speed between vehicle and obstacle, but rather they can only reduce the severity of the collision.

Since collisions can be effectively avoided even at high speeds through an evasive maneuver, emergency avoidance can be safer and more effective than automatic emergency braking in some driving situations. However, the vehicle can be brought into the limit range of the vehicle dynamics. Inexperienced drivers are often unable to cope with the respective hazard situations and are often incapable of successfully and properly executing the emergency evasive maneuver. Rather, the danger exists of the driver making an incorrect steering movement and then losing control of the vehicle. The driver should therefore be supported in an emergency evasive maneuver.

In this regard, an emergency avoidance system for motor vehicles is proposed in document DE 10 2004 008 894 A1. The system comprises an evaluation unit that determines at least one avoidance trajectory and/or at least one automatic emergency braking maneuver. After the initiation of the driving maneuver, an avoidance trajectory is communicated to the driver in the form of a steering-wheel torque applied by a suitable steering system. The driver can follow the suggested avoidance trajectory or steer past the applied steering-wheel torque.

A method and a device for executing an avoidance trajectory are known from document DE 10 2008 013 988 A1. The avoidance trajectory is calculated here as a so-called sigmoid function. To increase the stability of the vehicle during the evasive maneuver, a provision is made that a steering system combines a front-wheel steering function and a rear-wheel steering function in such a way that the front wheels and the rear wheels of the vehicle are controlled in the same direction.

A method and a device for steering a motor vehicle are known from document EP 1 926 654 B1. An avoidance trajectory is calculated and a control output signal is established in accordance with a deviation between an actual position and the target position prescribed by the avoidance trajectory in at least two linear control modules arranged in parallel. A trajectory specification in the form of a sigmoid has proven especially advantageous. The output signals of the parallel linear controllers are weighted as a function of the driving speed, and a steering angle is determined on the basis of the weighted controller output signals.

A method for avoiding the collision of a vehicle with at least one object or at least reducing the consequences thereof is known from document WO 2008/031662 A1. Using the sensor system of the vehicle, the current vehicle state and objects in the sensor detection range are identified. In consideration of the current vehicle state, an avoidance trajectory is determined from the totality of all possible movements of the vehicle by means of an optimization function. As soon as a driver avoidance reaction is determined, control signals for correcting the vehicle state are generated in such a way that the vehicle is guided in the direction of the avoidance trajectory.

A method for steering support in emergency maneuvers is known from document EP 2 323 890 B1. A trajectory calculation unit calculates driving lines of all drivable and stable movement trajectories. Upon identification of a hazard situation, the movement trajectory that corresponds to the driving maneuver indicated by the current steering wheel actuation is identified from the currently determined driving lines. The current steering angle is compared as an actual value to a target value determined from a determined avoidance trajectory. If the control deviation exceeds a predetermined value, the current steering angle is compensated by means of an additional steering angle and/or the required steering angle is communicated to the driver by means of counter-torque applied to the steering wheel.

The document "Querregelung eines Versuchsfahrzeugs entlang vorgegebener Bahnen" ["Lateral control of a test vehicle along predetermined trajectories"] by Steffen Kehl, published by Shaker Verlag in 2007, discloses a trajectory slave control that guides the vehicle's center of gravity along a predetermined trajectory by steering the vehicle. The Intention of this trajectory slave control is to ensure the reproducibility of driving tests. In the trajectory slave control described in this document, the steering mechanism is used as an actuator and an Integrated navigation system is used for the measurement. Clutch, gear shifting, gas and brake continue to be controlled by the test engineer/driver. The target trajectory curvature required by the controller is established in the form of the coefficients of a polynomial vector defined in segments, the degree of the polynomials being selected such that, when the target trajectory is followed by the vehicle, no jumps occur in the steering angle speed.

In the known systems, the avoidance trajectory defining the target course of the evasive maneuver is frequently determined from a plurality of possible movement trajectories. However, these movement trajectories can only be calculated with great computational effort. The avoidance trajectories, the course of which is calculated by means of a sigmoid function, are not constant at the transitions from normal driving to evasive maneuver, thus resulting in jumps in their course that impair driver comfort and render difficult the controlling of the evasive maneuver.

SUMMARY OF THE INVENTION

It is therefore the object of the present invention to provide devices and methods with which the driver of the land vehicle is supported during an evasive maneuver.

To achieve the object, a control device for a land vehicle is proposed. The control device is set up to control at least one actuator of the land vehicle on the basis of an avoidance trajectory calculated by the control device in order to support the driver of the land vehicle during an evasive maneuver. Furthermore, the control device is set up to receive sensor signals of at least one sensor; to generate an environmental model from the received sensor signals; to determine the position of an object relative to the current position of the land vehicle in the generated environmental model; and to calculate a preliminary avoidance trajectory. In the calculation of the preliminary avoidance trajectory, the current position of the land vehicle in the generated environmental model constitutes the starting point of the preliminary avoidance trajectory. A preliminary end point of the preliminary avoidance trajectory is determined on the basis of the determined position of the object. To determine the parameters of the preliminary avoidance trajectory, at least the coordinates of the starting point and of the preliminary end point are used.

In addition, a steering support system for a land vehicle is proposed in order to achieve the object. The steering support system comprises at least one camera and/or at least one radar sensor. In addition, the steering support system comprises at least one steering support actuator and a control device. The control device is set up to control at least one steering support actuator on the basis of an avoidance trajectory calculated by the control device in order to support the driver of the land vehicle during an evasive maneuver. The control device is also set up to receive sensor signals of the at least one camera and/or of the at least one sensor; to generate an environmental model from the received sensor signals; to determine the position of an object relative to the current position of the land vehicle in the generated environmental model; and to calculate a preliminary avoidance trajectory. In the calculation of the preliminary avoidance trajectory, the current position of the land vehicle in the generated environmental model constitutes the starting point of the preliminary avoidance trajectory. A preliminary end point of the preliminary avoidance trajectory is determined on the basis of the determined position of the object. To determine the parameters of the preliminary avoidance trajectory, at least the coordinates of the starting point and of the preliminary end point are used.

Moreover, a method for calculating an avoidance trajectory for a steering support function of a land vehicle is proposed in order to achieve the object. The method comprises the receiving sensor signals of at least one sensor; generating an environmental model from the received sensor signals; determining the position of an object relative to the current position of the driver's own land vehicle in the generated environmental model; and calculating a preliminary avoidance trajectory. In the calculation of the preliminary avoidance trajectory, the current position of the land vehicle in the generated environmental model constitutes the starting point of the preliminary avoidance trajectory. A preliminary end point of the preliminary avoidance trajectory is determined on the basis of the determined position of the object in the environmental model. To determine the parameters of the preliminary avoidance trajectory, at least the coordinates of the starting point and of the preliminary end point are used.

With the proposed control device, system and method, the avoidance trajectory used to describe the course of the evasive maneuver can be calculated effectively, that is, determined with ease. What is more, the determined avoidance trajectory can be described by simple mathematical relationships. Target values for lateral offset, lateral speed and lateral acceleration can be determined from the calculated avoidance trajectory for each time point of the evasive maneuver. Accordingly, the determined avoidance trajectory enables easy control. Furthermore, the determined avoidance trajectory has a course that results in low lateral speeds and lateral accelerations.

Design and Characteristics

The control device can also be set up to extend the preliminary avoidance trajectory by changing the coordinates of the preliminary end point in order to identify an optimized avoidance trajectory. The extending of the preliminary avoidance trajectory can be done iteratively. The extending of the preliminary avoidance trajectory can comprise the shifting of the x-coordinate of the preliminary end point; determining an extended avoidance trajectory; determining whether the extended avoidance trajectory maintains a safe distance from the object; and if the safe distance is not maintained, interrupting the extension, in which case the last extended avoidance trajectory in which the safe distance from the object is maintained can be selected as the optimized avoidance trajectory.

Target values for controlling the evasive maneuver can be determined from the preliminary avoidance trajectory or optimized avoidance trajectory calculated by the control device. The avoidance trajectory can be used as the target position of the land vehicle during the evasive maneuver. Additional target values can be determined on the basis of the first, second and/or third derivation of the avoidance trajectory following the course in the x-direction.

The preliminary end point of the avoidance trajectory can be placed next to the object. For example, the preliminary end point can be arranged next to a rear edge of the object. The rear edge of the object can delimit the object toward an open traffic space. The rear edge of the object can be a vertical edge of the object. The rear edge of the object can be a rear edge of the object identified in the environmental model. The rear edge of the object can be a right rear edge or a left rear edge. The x-coordinate of the preliminary end point can be determined based on the x-distance (distance in the x-direction) between the driver's own vehicle and the rear edge of the object. The y-coordinate of the preliminary end point can be determined based on a y-distance (distance in the y-direction) of the vehicle to the rear edge of the object. Alternatively, the y-coordinate can be determined from the environmental model. For example, the y-coordinate can be selected such that the center of gravity of the vehicle lies at the end point of the avoidance trajectory approximately in the middle of a traffic lane in the environmental model or the vehicle is offset in relation to a lateral limit of the traffic lane contained in the environmental model.

The course of the avoidance trajectory can correspond to the course of a polynomial. For example, the course of the avoidance trajectory can correspond to a third- to eighth-degree polynomial. The course of the avoidance trajectory can correspond to a fifth- or sixth-degree polynomial. An equation system can be set up to determine the parameters of the polynomial and/or of the avoidance trajectory. The established equation system can comprise at least six equations. The equation system can comprise derivations of the polynomial following the course. To solve the equation system, the values for the derivations of the polynomial following the course can be determined from the environmental model and/or with the vehicle sensors.

The control device can be set up to calculate a new avoidance trajectory if a determined actual value of the lateral offset lies outside of a tolerance band. The control device can be set up to calculate a new avoidance trajectory if a determined actual value for the lateral speed and/or the lateral acceleration lies outside of a tolerance band.

The details explained above are portrayed in conjunction. It should be noted, however, that they are also independent of one another and can also be freely combined. The procedures depicted in the figures are not limitative but merely for purpose of illustration. Individual sub-steps can also be carried out in a sequence that differs from the sequence shown and can also differ from those shown.

BRIEF DESCRIPTION OF THE DRAWINGS

Additional aims, features, advantages and possible applications follow from the following description of exemplary embodiments and the associated drawings, which are not to be understood as being limitative.

DESCRIPTION

Figure 1:
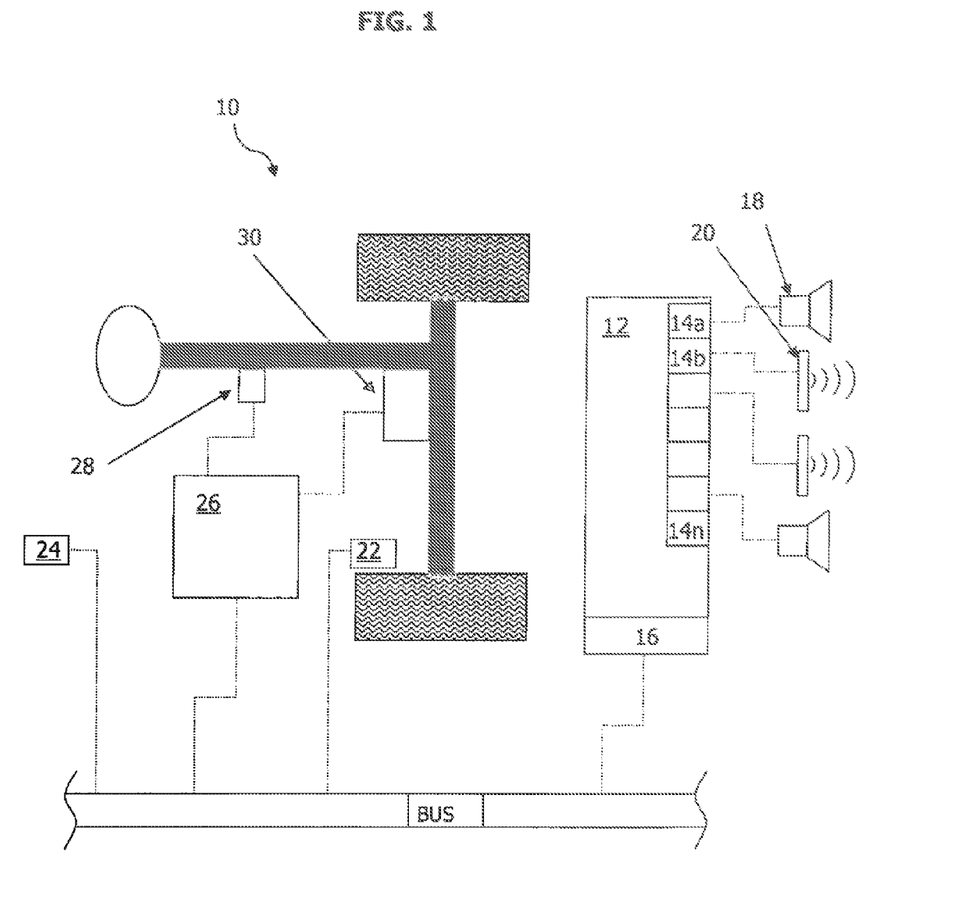
FIG. 1 is schematic representation of a first exemplary embodiment of an avoidance support system.

FIG. 1 is a schematic representation of an avoidance support system of a land vehicle that supports the driver of the land vehicle during an evasive maneuver. The evasive maneuver can be carried out at reduced or constant speed.

In the exemplary embodiment depicted in FIG. 1, the avoidance support system 10 (ESA system; ESA=Emergency Steering Assist) comprises a control device 12, sensors and actuators. The control device 12 can also be referred to as the ESA control device 12.

In the exemplary embodiment depicted in FIG. 1, the ESA control device 12 has at least one connection 14a, 14b, . . . , 14n for receiving sensor signals and at least one connection 16 of a bus system such as, for example, CAN, LIN, Flexray, etc. In addition, connections for outputting control signals, control commands, etc. (not shown in FIG. 1), can be provided. The ESA control device 12 is connected via the inputs 14a, 14b, . . . , 14n, for example, to at least one camera 18 and/or at least one radar sensor 20. The signals from a speed sensor 22 and an acceleration sensor 24 are fed to the ESA control device 12 via the bus connection 16, for example. The acceleration sensor 24 can detect the lateral acceleration and/or longitudinal acceleration and/or yaw rate of the vehicle.

In addition, the control device 12 is connected to a control device 26 of an electromechanical servo-steering mechanism (EPS control device; EPS=Electrically Powered Steering) via the bus connection 16. The EPS control device 26 is connected at least to a steering angle sensor 28, which also detects the steering-wheel torque applied by the driver, and a steering support actuator 30.

Furthermore, the ESA control device 12 can be connected directly or indirectly to additional sensors or actuators of the vehicle. What is meant by an indirect connection is a connection in which the ESA control device 12 does not receive the signals directly from a sensor or output them to an actuator, but via a control device connected to the sensor or actuator, the control device connected to the sensor or actuator being capable of processing the respective signals. For example, the ESA control device 12 could access sensor signals of a GPS sensor of a Navigation system indirectly.

The depicted sensors of the ESA system 10 can be part of other driver assistance systems or be used to implement other driver assistance functions. For instance, the ESA control device 12 can use sensor signals from cameras 18 or radar sensors 20 of an adaptive speed control system (ACC system), of a lane guidance system, of a forward-looking collision warning system (FCW system) or of an automatic emergency braking system (AEB system). The ESA control device 12 can receive the respective sensor signals via the connections 14a, 14b, . . . , 14n and/or via the bus connection 16.

Figure 2:
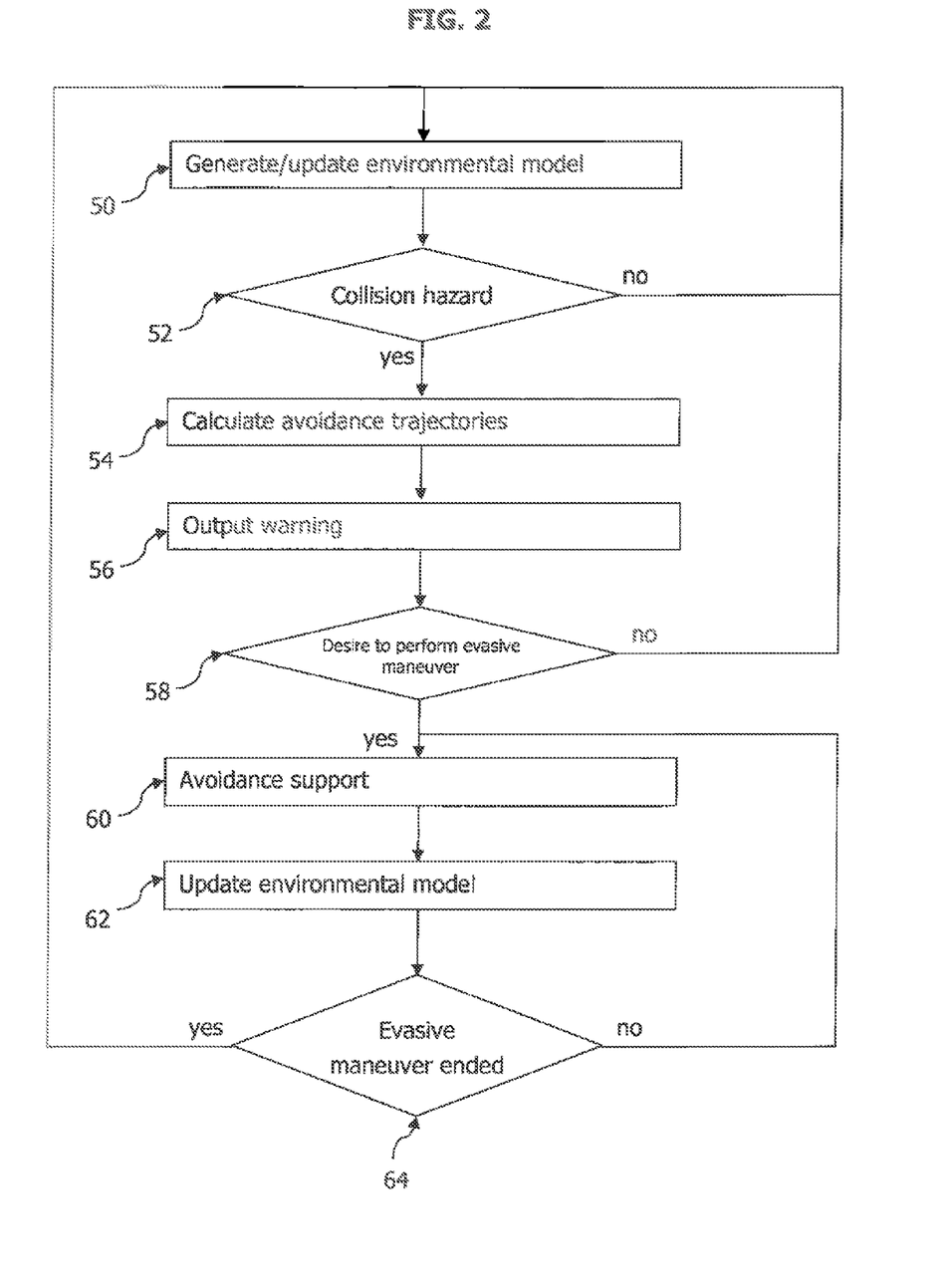
FIG. 2 is a schematic flow diagram for a supported evasive maneuver.

FIG. 2 is a schematic flow diagram for an evasive maneuver in which the driver is supported by the ESA control device 12. The sequence of the blocks shown in FIG. 2 can be changed. In addition, several of the blocks can be left out. For example, blocks 56 and 62 in particular can be executed earlier or later in the flow diagram. What is more, individual blocks can be executed only in every second or third pass through the respective loop.

Block 50 represents the starting state. This is a state in which intervention of the ESA control device 12 or evasion by the driver is not necessary. In the starting state, the ESA control device 12 combines the sensor signals received from the at least one camera 18 and/or the at least one radar sensor 20. The ESA control device 12 generates an environmental model from the combined sensor signals. Besides the sensor signals of the camera 18 and of the radar sensor 20, the environmental model can also contain information of other sensors, such as speed information outputted by the speed sensor 22, for example. The environmental model maps at least the traffic space lying in front of the driver's own vehicle. For example, the environmental model can contain the position, the measurements, the speed, the acceleration and the direction of movement of the driver's own vehicle and the position, the measurements, the speed, the acceleration and the direction of movement of objects or obstacles, such as other vehicles, for example. Furthermore, the environmental model can contain the course of the road in front of the driver's own vehicle. The information on the objects/obstacles detected by the vehicle environment sensor system can be contained in the environmental model as relative values and/or as absolute values.

In block 52, the ESA control device 12 decides whether a danger of collision exists. This condition can be met, for example, if the distance to an object is less than a minimum distance and/or if there is a threat of a collision if the speeds and/or accelerations of the object and of the driver's own vehicle remain the same. The decision regarding danger of collision can be made, for example, on the basis of the methods and criteria described in document WO 2012/062451 A1. The disclosure of document WO 2012/062451 A1 is hereby incorporated by reference. If no danger of collision exists, the process returns to block 50 and updates the environmental model. If danger of collision exists, the process continues to block 54.

In block 54, the ESA control device 12 calculates at least one avoidance trajectory in consideration of the spatial situation and the current traffic situation that is known from the environmental model. In the case of roads with only two lanes of travel, such as country roads, for example, the ESA control device 12 generally only determines one avoidance trajectory, since sufficient space for an evasive maneuver only exists on one side of the object (open traffic space). In contrast, in the case of roads with several lanes, or when there is sufficient open traffic space, such as on interstates, the ESA control device 12 will determine at least one "left" and at least one "right" avoidance trajectory, so that the vehicle can execute an evasive maneuver to the right or to the left. The calculation of the avoidance trajectory is explained in detail in relation to FIGS. 3 to 5.

In block 56, a warning signal can be outputted to the driver. For example, an acoustic, optical or haptic warning signal can be outputted. In addition, a warning signal can be outputted for other traffic participants, for example through activation of a hazard warning system or of a directional indicator of the vehicle. What is more, a preferred direction for the evasive maneuver can be indicated to the driver.

In block 58, the ESA control device 12 identifies a desire on the part of the driver to perform an evasive maneuver. For example, a change in the steering angle detected by the steering angle sensor 28 can be interpreted by the ESA control device 12 as the driver's desire to execute an evasive maneuver. In order to identify the driver's desire to execute an evasive maneuver, the steering angle and/or the change in steering angle and/or the steering-wheel torque is compared to threshold values. These threshold values can be dependent on the speed of the driver's own vehicle, for example. In addition, the driver can determine through the direction of the steering movement whether he would like to make an evasive maneuver to the left or to the right. One of two determined avoidance trajectories can thus be selected in block 58.

In block 60, the ESA control device 12 supports the driver in executing the evasive maneuver. This is achieved, for example, through application of appropriate superimposed torque. To determine the superimposed torque to be applied, the ESA control device 12 compares the current position of the vehicle in the environmental model to a target position prescribed by the avoidance trajectory. To determine the superimposed torque to be applied, additional parameters from the environmental model can be taken into account, such as the lateral speed, the lateral acceleration and/or the steering angle. The supporting of the driver is explained in detail in relation to FIGS. 5 and 6.

In order to compensate for possible deviations, the ESA control device 12 can output control signals via the EPS control device 26 to the steering support actuator 30. The steering support actuator 30 then generates forces or torques commensurate with the control signals. For example, the steering support actuator 30 can generate a superimposed torque that the driver perceives as a pulling of the steering wheel in the direction of a target steering wheel angle. The torque superimposed by the steering support actuator can be selected such that it is clearly perceptible for the driver but can be overridden without much effort. If the driver does not counter-steer, that is, if the driver does not apply any counter-torque, then the actual steering wheel angle specified by the driver approaches the target steering wheel angle.

In block 62, the environmental model is updated. The position of the block 62 can vary within the flow diagram. For example, the environmental model can also be updated before block 60 or after block 62.

In block 64, the ESA control device 12 recognizes that the evasive maneuver has been concluded and continues the process in block 50. Conditions for the conclusion of the avoidance procedure can be, for example, the reaching of a target offset, a target lateral speed, a target lateral acceleration and/or a target position. If the conditions for the conclusion of the evasive maneuver are not met, the process jumps back to block 60. If it is recognized that the evasive maneuver has been concluded, the process continues with block 50.

In the event that, due to disturbance variables or other influences, for example if the driver steers over the steering support made available by the ESA system 10, the vehicle cannot be guided on the determined avoidance trajectory, this can be recognized by the fact that the center of gravity of the driver's own vehicle leaves a tolerance band around the avoidance trajectory. In addition, tolerance ranges can be provided, for example, for the lateral speed, lateral acceleration and/or the steering wheel angle set by the driver. As soon as a departure from the tolerance band or the tolerance range is identified by the ESA control device 12, a new avoidance trajectory can be calculated for the current traffic situation. That is, the process can be continued in block 54, and the driver can be informed in block 56 that a new avoidance trajectory has been calculated. The size of the tolerance band for the avoidance trajectory or the tolerance range for the lateral speed, lateral acceleration and steering wheel angle can be specified as a function of the vehicle dynamics. The vehicle dynamics and the corresponding values for the tolerance band as well as the values for the tolerance ranges can be determined through drive tests, for example.

If no desire on the part of the driver to perform an evasive maneuver is detected in block 58, or if the process is interrupted—for example, because cause no meaningful avoidance trajectory could be calculated in block 54—an automatic emergency braking process can be triggered.

Figure 3A:
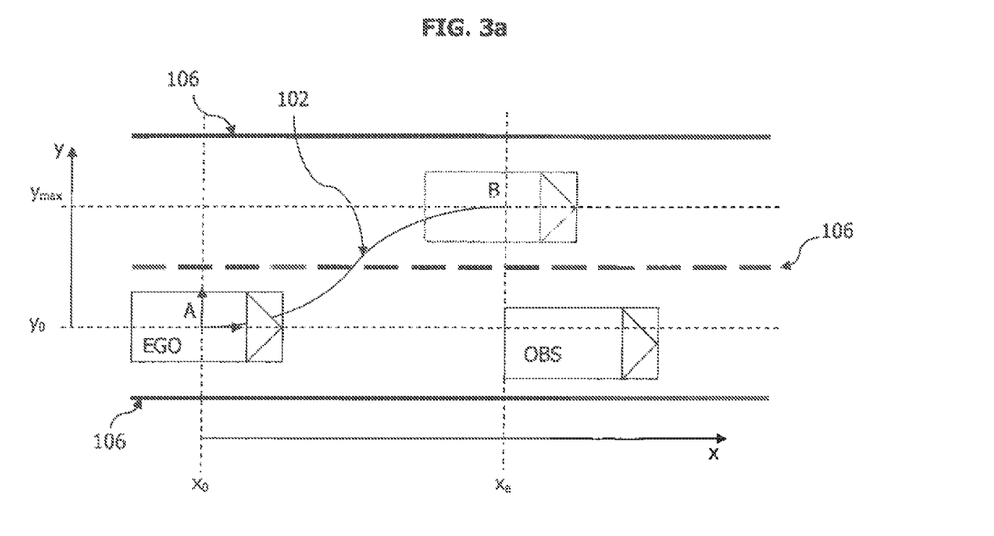
FIG. 3a is a schematic representation of a traffic situation.
Figure 3B:
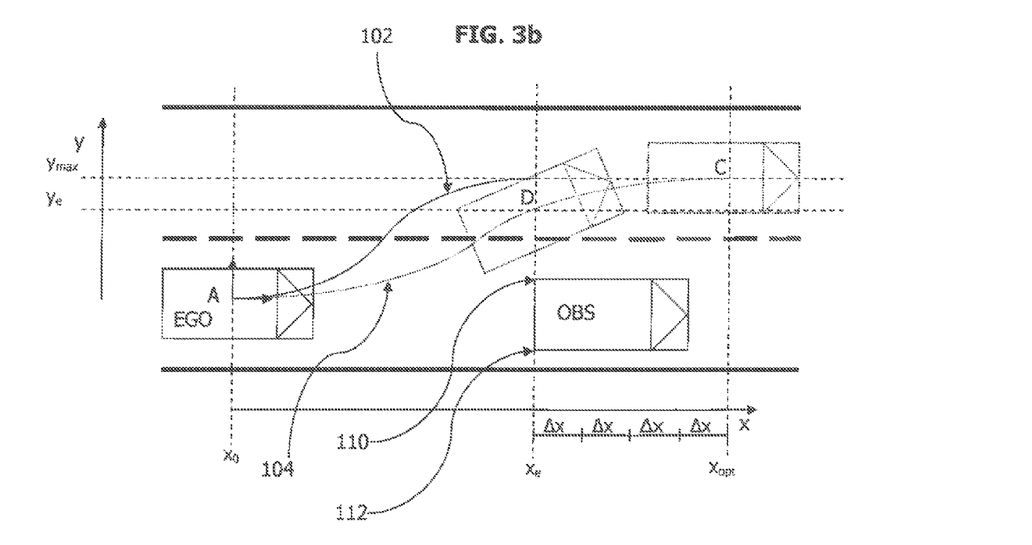
FIG. 3b is a schematic representation of a traffic situation in which the avoidance trajectory is extended.

FIGS. 3a and 3b are schematic representations of a traffic situation in which the driver's own vehicle EGO performs an evasive maneuver in order to avoid a collision with the object OBS—a vehicle driving up ahead at low speed, for example. A road with two driving lanes is depicted, the driver's own vehicle EGO and the object OBS being located in the right lane and the driver's own vehicle switching to the left lane as a result of the evasive maneuver.

As was already explained in relation to blocks 50 and 52 of FIG. 2, the ESA control device 12 generates an environmental model and decides on the basis of the environmental model whether or not there is a threat of a collision with the object OBS.

As indicated by the coordinate system depicted in FIG. 3a, the center of gravity of the driver's own vehicle EGO can be selected as the origin of an environmental model coordinate system at least by the beginning of the evasive maneuver. During the evasive maneuver, a stationary coordinate system can be used for the environmental model. For example, if the driver's desire for an evasive maneuver is identified in block 58, the ESA control device 12 can convert the current coordinate system into a stationary coordinate system. Therefore, while the driver's own vehicle is "still" and the road "moves" before the evasive maneuver, the driver's own vehicle "moves" in the environmental model during the evasive maneuver and the course of the road is stationary.

The ESA control device 12 can determine the position and the course of traffic lane markers 106 and/or traffic lane limits from the sensor signals. From these determined data, the ESA control device 12 can determine the course of the road lying in front of the vehicle in the direction of travel. Particularly on the basis of the radar signals, the ESA control device 12 can determine the position of objects OBS located in front of the driver's own vehicle EGO in the direction of travel. Besides the position of objects OBS, the ESA control device 12 can also determine at least the width of the objects.

Based on changes in the position of the object OBS in the environmental model relative to the driver's own vehicle EGO, the control device 12 can determine the relative speed of the object OBS. By adding the relative speed of the object OBS to the speed of the driver's own vehicle detected by the speed sensor 22, the control device 12 can determine the absolute speed of the object OBS. The acceleration and the direction of motion of the object OBS can be determined in similar fashion.

In addition to the sensor signals of the camera 18, of the radar sensor 20 and of the speed sensor 22, the environmental model and the combined sensor signals can also contain data from other sensors of the vehicle. For example, the combined sensor signals or the environmental model can also contain information or data on the lateral or longitudinal acceleration, the yaw rate or the steering angle.

A preliminary avoidance trajectory 102 is drawn with a solid line in FIG. 3a. The starting point A of the preliminary avoidance trajectory 102 is the center of gravity of the driver's own vehicle EGO at the time point at which the ESA control device 12 identifies the driver's desire to execute an evasive maneuver. If the environmental model coordinate system is converted into a stationary coordinate system at the beginning of the evasive maneuver, the center of gravity of the driver's own vehicle EGO is located at the origin of the environmental model coordinate system at the beginning of the evasive maneuver. The coordinates $x_0$ and $y_0$ therefore each have the value zero for the starting point A.

The determination of the coordinate $x_e$ for the end point B of the preliminary avoidance trajectory 102 can be based on the assumption that, if the speeds, accelerations and directions of motion remain constant, the evasive maneuver, that is, the lateral offsetting of the driver's own vehicle EGO, should be concluded by no later than after the distance to an expected collision point has been traveled. The coordinate $x_e$ can thus be determined on the basis of the expected collision point with the object OBS. The ESA control device 12 can determine the expected collision point on the basis of the current speed, acceleration and/or direction of motion of the driver's own vehicle EGO and of the object OBS, for example.

In the exemplary embodiment shown in FIG. 3a, the coordinate $y_{max}$ of the end point B of the preliminary avoidance trajectory 102 can be found through the environment. For example, the coordinate $y_{max}$ can be determined such that the center of gravity of the driver's own vehicle EGO is located approximately in the center of the left lane at the end of the evasive maneuver, that is, at the end point B of the avoidance trajectory. Alternatively, the coordinate $y_{max}$ can also be selected on the basis of a distance of the vehicle center of gravity of the driver's own vehicle to the object OBS.

Insofar as the situation so permits, the driver's own vehicle EGO can also make the evasive maneuver to the right, Corresponding starting and end coordinates for a "right" avoidance trajectory can be determined with the assumptions explained above. The "right" and/or "left" avoidance trajectory can only be calculated if the ESA control device 12 detects open traffic space to the right or left of the object. For example, the ESA control device 12 can only determine a right or left avoidance trajectory of the environmental model has a commensurate lane.

The course of the preliminary avoidance trajectory 102 between the points A and B can be determined using a polynomial. For example, the course of the preliminary avoidance trajectory can correspond to a third- to eighth-degree polynomial. Below, the calculation of a preliminary avoidance trajectory will be explained for an exemplary embodiment whose course corresponds to a fifth-degree polynomial. The following equation (1) describes such a polynomial.

$$y=f(x)=a_5x^5+a_4x^4+a_3x^3+a_2x^2+a_1x+a_0 \quad (1)$$

The respective y-values of the polynomial correspond to the lateral offset of the vehicle. The coefficients $a_5$-$a_0$ of the polynomial can be determined on the basis of the following boundary conditions (2)-(7) and by setting up and solving an equation system.

$$f(x_0)=y_0 \quad (2)$$

Since the position of the vehicle at the beginning of the evasive maneuver corresponds to the current position of the driver's own vehicle in the environmental model, the values of the parameters $x_0$ and $y_0$ are known. If the center of gravity of the driver's own vehicle lies at the origin, the values of the parameters $x_0$ and $y_0$ are each zero.

$$f'(x_0)=m_{01} \quad (3)$$

$$f''(x_0)=m_{02} \quad (4)$$

The first derivation (f'(x) and the second derivation f''(x) of the polynomial f(x) following the course in the x-direction at the starting point A, i.e., for the coordinate $x_0$, correspond to the parameters $m_{01}$ and $m_{02}$. The values of the parameters $m_{01}$ and $m_{02}$ can be determined from the environmental model. For example, the ESA control device 12 can detect positional changes of the driver's own vehicle in the environmental model based on the relative position of traffic lane limits 106 and/or delineator posts in the environmental model. However, the values for the parameters $m_{01}$ and $m_{02}$ can also be determined from the sensor signals of the acceleration sensor 24. On a straight stretch, the parameters $m_{01}$ and $m_{02}$ generally have the value zero.

$$f(x_e)=y_{max} \quad (5)$$

$$f'(x_e)=m_{e1} \quad (5)$$

$$f''(x_e)=m_{e2} \quad (7)$$

The parameter $y_{max}$ corresponds to the intended or desired offset in the end point B. The parameters $m_{01}$ and $m_{02}$ correspond to the first and second derivation of the trajectory in the end point B. As was already explained above, the value of the parameter $y_{max}$ can be selected such that the center of gravity of the driver's own vehicle EGO is located approximately in the middle of the left traffic lane at the end of the evasive maneuver. Similarly to the parameters $m_{01}$ and $m_{02}$ for the initial value, the values of the parameters $m_{e1}$ and $m_{e2}$ can be determined as a function of the course of the road in the environmental model. For a straight stretch, the parameters $m_{e1}$ and $m_{e2}$ generally have the value zero.

A reliable value range can be defined for the parameters $m_{01}$, $m_{02}$, $m_{e1}$ and $m_{e2}$. The method can be interrupted if one of the values determined for the parameters $m_{01}$, $m_{02}$, $m_{e1}$ and $m_{e2}$ lies outside of the permissible value range. This can be the case, for example, if the road course in front of the driver's own vehicle has a very pronounced curve. If the calculation of the avoidance trajectory is aborted, the driver can be alerted to an imminent collision and of the fact that an evasive maneuver is not being supported. In addition, automatic emergency braking can be triggered.

With the known values for the starting point and the intended values for the end point of the preliminary avoidance trajectory 102, an equation system with six equations can be set up with a polynomial f(x), the first derivation f'(x) following the course and the second derivation f"(x) following the course in order to calculate the unknown coefficients $a_5$-$a_0$ of the polynomial.

The course of the avoidance trajectory can also be determined with third- to eighth-degree polynomials. Avoidance trajectories whose course corresponds at least to a fourth-degree polynomial are twice continuously differentiable at the transitions between normal driving and evasive maneuvering, i.e., at the starting point and at the end point of the avoidance trajectory. While the avoidance trajectories that are known from the prior art, whose courses correspond to sigmoid functions, are multiply continuously differentiable, discontinuities occur in the transitions between normal driving and evasive maneuvering. As a result of the sigmoid function, jumps occur in the course of the trajectory that have a negative impact on the controlling of the lateral speed and/or the lateral acceleration of the vehicle.

To determine the coefficients of the third- to eighth-degree polynomials, equation systems can be established in which the number of equations to be set up follows generally from the number of coefficients to be calculated. The table below shows an example of which parameters/boundary conditions known from the environmental model can be used to solve the respective equation systems. For the calculation of even polynomials, that is, of fourth-, sixth- or eighth-degree polynomials, the boundary condition posited in equation (8) can additionally be used.

| | | |
|---|---|---|
| $f(x_0) = y_0$ | $f(x_e) = y_{max}$ | |
| $f'(x_0) = m_{01}$ | $f'(x_e) = y_{01}$ | 3rd and 4th degree |
| $f''(x_0) = m_{02}$ | $f''(x_e) = y_{02}$ | 5th and 6th degree |
| $f'''(x_0) = m_{03}$ | $f'''(x_0) = y_{03}$ | 7th and 8th degree |

$$f(x_e/2) = y_0 + y_{max}/2 \quad (8)$$

Equation (8) is based on the assumption that, upon traveling half of the course in the x-direction, i.e., in the middle of the avoidance trajectory, half of the course in the y-direction should also have been traveled.

Figure 4:
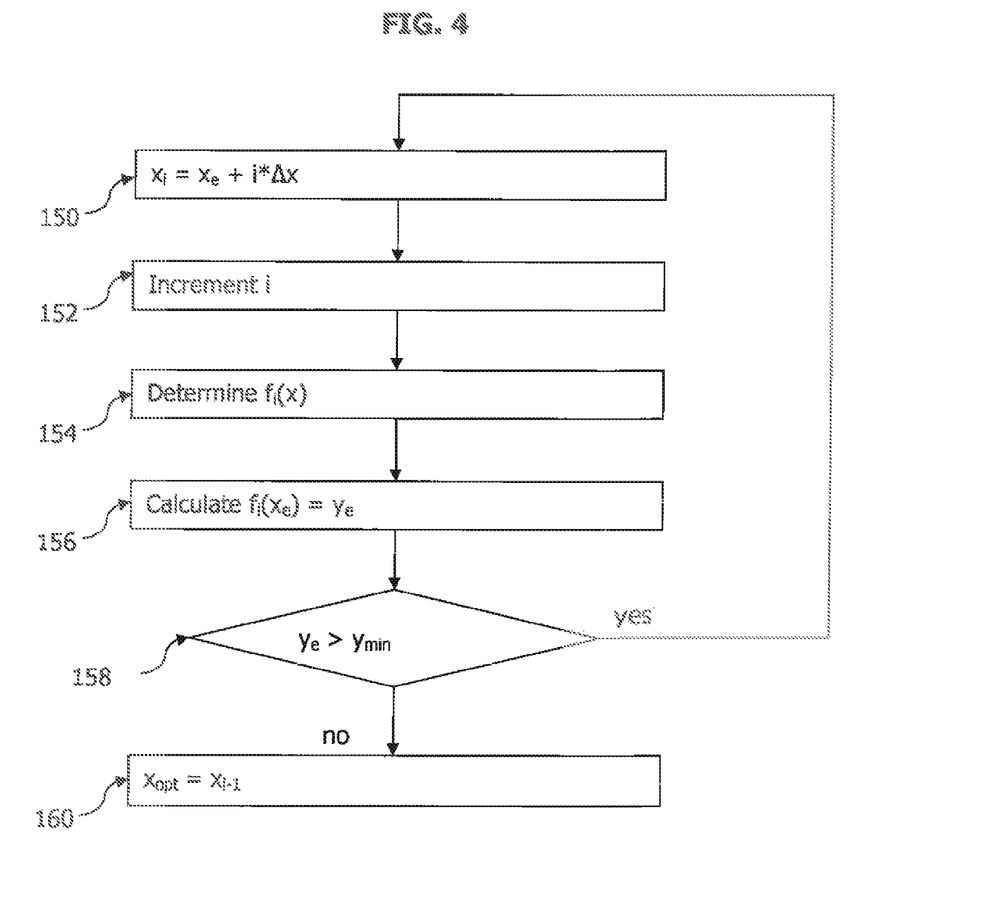
FIG. 4 is a schematic flow diagram for an avoidance trajectory extension method.

To optimize the preliminary avoidance trajectory 102, the preliminary avoidance trajectory 102 can be extended. This is shown in FIGS. 3b and 4. To extend the preliminary avoidance trajectory 102, the end point B is moved incrementally to the right until the end point C is reached. As a result of the extending of the preliminary avoidance trajectory 102, it becomes "flatter," that is, its curvature decreases. This results in lower lateral speeds and/or lateral accelerations acting on the vehicle that result from the course of the trajectory. The position of the end point C is not known at the beginning of the extension process and can be determined on the basis of a crossing point D. The extended avoidance trajectory can also be referred to as an optimized avoidance trajectory 104. The point D is selected such that the driver's own vehicle EGO can drive past the object OBS without a collision. That is, the driver's own vehicle EGO has a minimal lateral distance to the object OBS at the expected collision point. The crossing point D can be determined as a function of a relative edge of the object OBS, a safety distance and half of the width of the driver's own vehicle EGO. The relevant edge of the object OBS can be the edge of the object OBS that is closest to the avoidance trajectory. In the example shown in FIG. 3b, this is the rear-left edge 110 of the object OBS. If the driver's own vehicle EGO were to drive past the object OBS on the right, the rear-right edge 112 of the object OBS would be selected as the relevant edge of the object OBS.

In the exemplary embodiment shown in FIG. 3a, the parameter $x_e$, i.e., the x-coordinate of the end point B of the preliminary avoidance trajectory 102, was already determined on the basis of a rear edge of the object OBS. Accordingly, the parameter $x_e$ can also be used as the x-coordinate for the crossing point D. The y-coordinate of the crossing point D, i.e., the value $y_e$, can be determined using the following steps, for example.

FIG. 4 is a schematic representation of a flow diagram for the iterative extension of the avoidance trajectory. This method can be carried out by the ESA control device 12, for example. For the iterative extension of the preliminary avoidance trajectory 102, the value of the parameter $x_e$ can be increased incrementally by a value $\Delta x$ until an optimized avoidance trajectory is found. This is indicated in FIG. 3b by the segments designated by $\Delta x$.

The value $x_i$ is calculated in block 150. The value $x_i$ is obtained by adding the x-coordinate $x_e$ of the end point of the preliminary avoidance trajectory 102 to the increment $\Delta x$. The increment $\Delta x$ is multiplied by the increment i, which is increased respectively in block 152 by '1'. The value $x_i$ thus increases by an increment $\Delta x$ each time the loop is passed through.

In block 154, the equation system is solved for the new value $x_i$ in order to obtain the corresponding coefficients of the polynomial $f_i(x)$. The values of the parameters $y_{max}$, $m_{e1}$ and $m_{e2}$ can each be adapted to the environment of the vehicle at the level of coordinate $x_i$.

In block 156, the value $x_e$ is inserted into the newly calculated polynomial $f_i(x)$ in order to obtain the value $y_e$ for the crossing point D. Since the avoidance trajectory becomes "flatter" as a result of the extension with each pass through the loop, the crossing point D is shifted upon each pass through the loop in the direction of the edge 110 of the object OBS.

In block 158, the newly calculated value $y_e$ is compared to a distance threshold $y_{min}$. The distance threshold $y_{min}$ can be defined such that the driver's own vehicle EGO can safely pass the object OBS. For example, the distance threshold $y_{min}$ can be determined by adding the y-coordinate of the rear-left edge 110 of the object, a safety distance and half of the width of the driver's own vehicle. In addition, the safety distance can be dependent on the speed of the driver's own vehicle EGO and/or of the object OBS. Furthermore, the distance threshold $y_{min}$ can be calculated or determined, for example, at the level of $x_e$ on the basis of the y-coordinate of the traffic lane marker 106 shown by a broken line in FIG. 3b.

If the value $y_e$ calculated for the value $x_e$ is greater than the distance threshold $y_{min}$, the driver's own vehicle EGO can safely pass the object OBS. The method jumps to block 150 and is carried out for a value $x_i$ increased by the increment $\Delta x$. If the parameter $y_e$ is less than or equal to the distance threshold $y_{min}$, the extension process is aborted and the value $x_{i-1}$ calculated in the previous loop is adopted as the value for $x_{opt}$, that is, the x-coordinate of the end point of the optimized avoidance trajectory.

The intended lateral offset of the vehicle center of gravity can be calculated for each point along the evasive maneuver based on the determined avoidance trajectory. The calculated lateral offset of the vehicle center of gravity can be used during the evasive maneuver to support the driver's steering movements. The respective intended lateral speed and intended lateral acceleration can be calculated on the basis of the first and second derivation of the avoidance trajectory following the course for each point along the avoidance trajectory. These values can also be used to support the driver during the evasive maneuver.

The intended lateral offset, the intended lateral speed and/or the intended lateral acceleration can be used, for example, by a controller of the ESA control device 12 as target values. The actual lateral offset can be determined from the environmental model. For example, the actual lateral offset can be determined on the basis of traffic lane limits or traffic lane markers 106 relative to the driver's own vehicle contained in the environmental model. Furthermore, the actual offset can also be determined on the basis of the relative position of the object in the environmental model.

The actual lateral speed and the actual lateral acceleration can be determined from the change in the position of the driver's own vehicle in the environmental model.

Figure 5:
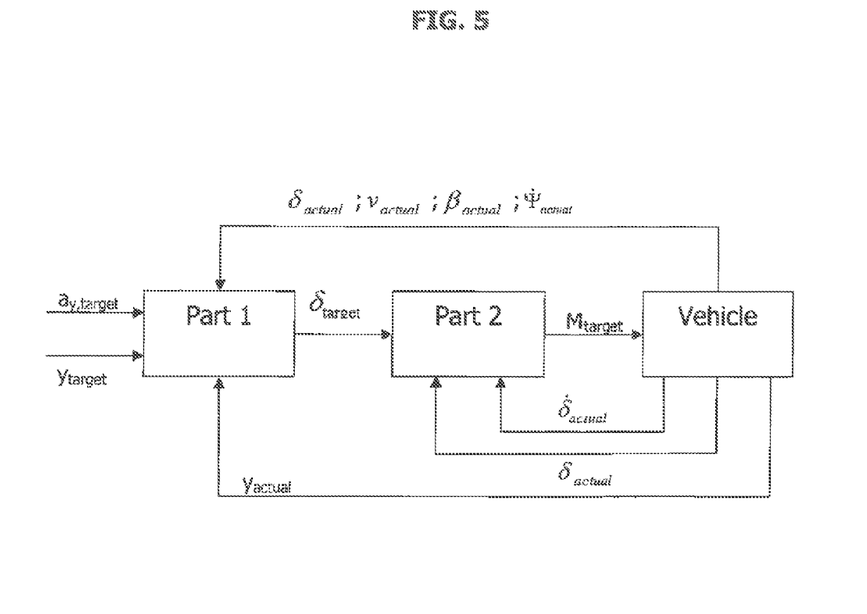
FIG. 5 is a schematic representation of a control concept.

FIG. 5 is a schematic representation of a control concept for the steering support. The control concept illustrated in FIG. 5 comprises two parts. In the first part, a target steering wheel angle $\delta_{target}$ is determined. The target steering wheel angle $\delta_{target}$ guides the driver's own vehicle on the determined avoidance trajectory selected by a steering movement by the driver. In the second part, a target value is determined for a torque $M_{target}$ to be superimposed by the steering support actuator 30. Through the superimposition of the torque $M_{target}$ in the electromechanical servo-steering, it is ensured in the first part that the actual steering wheel angle $\delta_{actual}$ specified by the driver approaches the target steering wheel angle $\delta_{target}$. The torque $M_{target}$ and/or the change in the steering wheel angle is selected such that the driver can steer through the superimposed torque $M_{target}$ and change the set steering wheel angle.

In the exemplary embodiment shown in FIG. 5, the target lateral offset $y_{target}$ and/or the target lateral acceleration $a_{y,\,target}$ are used as input values for the first part. The values of the input values $y_{target}$ and $a_{y,target}$ can be determined from the calculated avoidance trajectory. In addition, the current lateral offset $y_{actual}$ is used in the first part. The current lateral offset $y_{actual}$ of the driver's own vehicle can be determined from the environmental model or directly on the basis of the sensor signals of the at least one camera 18. Furthermore, the actual steering wheel angle $\delta_{actual}$, the actual vehicle speed $v_{actual}$, the actual sideslip angle $\beta_{actual}$ of the vehicle, the actual yaw rate $\hat{\psi}_{actual}$ and the current friction value $\mu_0$ can be used in the first part. The actual steering wheel angle $\delta_{actual}$, and the actual vehicle speed $v_{actual}$ can be determined with the steering angle sensor 28, the acceleration sensor 24 and the speed sensor 22. The actual sideslip angle $\beta_{actual}$ can be determined approximately by an observer structure or set at zero. The friction value $\mu_0$ can be determined, for example, between the blocks 52 and 58 depicted in FIG. 2, that is, after a collision hazard was identified in block 52 and before the driver's desire to execute an evasive maneuver has been Identified. The friction value $\mu_0$ can also be determined at the beginning of the evasive maneuver, for example during the first fractions of the evasive maneuver. In the event that it is not possible to determine a friction value $\mu_0$, a friction value $\mu_0$ that was determined or set previously can be used. Furthermore, it is also possible not to feed in, i.e., use, the friction value $\mu_0$.

Figure 6:
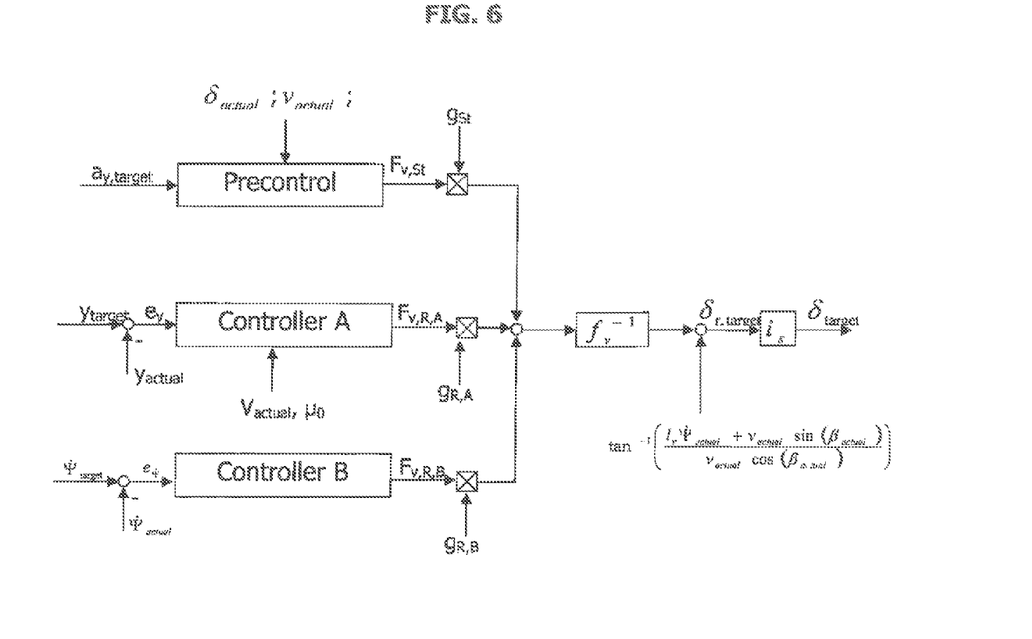
FIG. 6 is a schematic representation of a first part of the control concept depicted in FIG. 5.

The first part can comprise a pre-control, a first controller A and a second controller B. FIG. 6 is a schematic representation of the first part. The design of the first part is based on the assumption that the lateral force on the front wheel of the vehicle can be influenced by the steering angle $\delta$. For example, it is assumed that the lateral force on the front wheel $F_v$ depends on the tire slip angle $\alpha_v$ on the front wheel and on the friction value pairing of tire and driving surface (tire characteristic) of the front wheel. Starting from the assumptions and contexts of the single-lane model, it is assumed that the tire slip angle $\alpha_v$ on the front wheel depends on the sideslip angle $\beta$, the yaw rate $\hat{\psi}$ and the vehicle speed v, it also being possible to change the tire slip angle $\alpha_v$ on the front wheel by the wheel steering angle $\delta_r$. The pre-control, the first controller A and the second controller B are designed such that they output a portion of a force $F_v$ to be set on the front wheel as an actuating variable.

The precontrol can be provided for quick control. The target lateral acceleration $a_{y,target}$ can be used as an input variable for the precontrol. The actuating variable $F_{v,St}$ of the precontrol can be viewed as a portion of the force that is required in order to set the required target lateral acceleration $a_{y,target}$. The force $F_{v,St}$ to be set via the steering angle on the front wheel can be determined from the known mass of the vehicle and the lateral force on the rear wheel, which can be calculated for the rear wheel as a function of the tire characteristic. This is made clear by equation (9).

$$F_{v,St} = \frac{ma_{y,soll} - f_h\left(\tan^{-1}\left(\frac{l_n\Psi_{ist} - v_{ist}\sin(\beta_{ist})}{v_{ist}\cos(\beta_{ist})}\right)\right)}{\cos(\delta_r)} \quad (9)$$

The term $f_h$ describes the friction value pairing of tire and driving surface (tire characteristic) for the rear wheel. The tire characteristics for the rear wheel and front wheel can be approximated by at least two traverses. To solve equation (9), the wheel steering angle $\delta_r$, the vehicle speed v, the sideslip angle $\beta$ and the yaw rate $\hat{\psi}$ are additionally required. Therefore, the actual values of the wheel steering angle $\delta_r$, vehicle speed v, sideslip angle $\beta$ and yaw rate $\hat{\psi}$ are fed in. As a result of the usage of the actual values for the precontrol, it does not have a pure control structure. Rather, the precontrol is nonlinear due to the consideration of the wheel steering angle $\delta_r$, the vehicle speed v, the sideslip angle $\beta$ and the yaw rate $\hat{\psi}$. The precontrol is based on an inverted single-lane model that describes the dynamic vehicle behavior.

The first controller A can be a PD controller. In addition, the first controller A can be embodied as an adaptive PD controller. The control parameters of the adaptive PD controller A can be stored in a map. The control parameters can be read out from the map as a function of the actual vehicle speed $v_{actual}$ and/or the friction value $\mu_0$. Since the actual vehicle speed $v_{actual}$ and the friction value $\mu_0$ can change, different control parameters can be read out for different evasive maneuvers and even during one evasive maneuver. The adaptive first PD controller A is thus nonlinear. The deviation $e_y$ of the actual lateral offset $y_{actual}$ from the target lateral offset $y_{target}$ can be used as an input variable for the first controller A. The actuating variable $F_{v,R,A}$ of the first controller A can be a portion of the desired force on the front wheel that compensates for a deviation from the target lateral offset.

The second controller B can be a PD controller. The second controller B can be provided for the purpose of compensating for oversteering or understeering vehicle behavior. If an oversteering or understeering vehicle behavior is identified, the actuating variable $F_{v,R,A}$ of the second controller B can have the effect that the target steering wheel angle $\delta_{target}$ is reduced or, if necessary, that an opposed steering angle $\delta_{target}$ is set. The second PD controller B can be optional. The deviation $e_{\hat{\psi}}$ of the actual yaw rate $\hat{\psi}_{actual}$ from a target yaw rate $\dot{\psi}\hat{}_{target}$, for example, can be used as an input variable for the second controller B.

The target lateral acceleration $a_{y,target}$ is fed as an input variable to the precontrol, thus enabling the precontrol to quickly output an actuating value corresponding to the target lateral acceleration $a_{y,target}$. Since the deviation of the lateral offset $e_y$ is fed to the first controller A as an input variable, the first controller can compensate for the inaccuracies of the precontrol. For example, the actuating value of the first controller A can almost be disregarded if the precontrol guides the center of gravity of the driver's own vehicle EGO exactly along the avoidance trajectory. The first controller A thus increases the accuracy of the control. The second controller B can intervene particularly if the vehicle oversteers or understeers, for example, whereas the actuating value of the second controller B can almost be disregarded when the vehicle behavior is stable.

The actuating values $F_{v,St}$, $F_{v,R,A}$ and $F_{v,R,B}$ outputted by the first controller A and the second controller B can each be weighted. The weighting of the portions can depend on the dynamic driving state of the vehicle. For example, if a strong over- or understeering of the vehicle is detected, the weight of the second controller B can be increased. In the exemplary embodiment depicted in FIG. 6, the weighted actuating values $F_{v,St}$, $F_{v,R,A}$ and $F_{v,R,B}$ are added. The added weighted actuating values $F_{v,St}$, $F_{v,R,A}$ and $F_{v,R,B}$ yield the target value of a force $F_{v,target}$ to be set on the front wheel. As was already explained, it is assumed that the lateral force on the front wheel depends on the tire slip angle $\alpha_v$, it being possible to change the tire slip angle $\alpha_v$ on the front wheel through the wheel steering angle $\delta_r$. This assumption is shown in equation (10).

$$\alpha_v = \delta_r - \tan^{-1}\left(\frac{l_v \dot{\Psi} + v\sin(\beta)}{v\cos(\beta)}\right) \quad (10)$$

On the basis of equation (10) and the correlation between the lateral force and the tire slip angle $\alpha_v$ on the front wheel known from the tire characteristic $f_v$ for the front wheel, equation (10) can be converted into equation (11).

$$\delta_{r,soll} = f_v^{-1}(F_{v,soll}) + \tan^{-1}\left(\frac{l_v \dot{\Psi}_{ist} + v_{ist}\sin(\beta_{ist})}{v_{ist}\cos(\beta_{ist})}\right) \quad (11)$$

According to the correlation described in equation (11), in the controller shown in FIG. 6, the determined target value $F_{v,target}$ is taken into account as a function of the tire characteristics $f_v$ for the friction value pairing of tires and driving surface for the front wheel. In addition, the term for the tire slip angle $\alpha$ is added. The target wheel steering angle $\delta_{r,target}$ can be multiplied by a steering ratio $i_s$ in order to obtain the target steering wheel angle $\delta_{target}$. Through the use of the tire characteristic and/or the partially inverted tire characteristic, the first part of the control can be prevented from tightening the steering unnecessarily hard and excessively understeering the vehicle.

The target steering wheel angle $\delta_{target}$ determined by the first part of the controller is fed to the second part. In addition, the current actual steering wheel angle $\delta_{actual}$ and/or the change of the actual steering wheel angle over time, i.e., the actual steering wheel angle speed $\delta\hat{}_{actual}$, can be fed to the second part of the controller. The current values for the actual steering wheel angle $\delta_{actual}$ and the actual steering wheel angle speed $\delta\hat{}_{actual}$ can be determined on the basis of the sensor signals or the change in the sensor signals of the steering angle sensor 28.

The second part of the control concept depicted in FIG. 5 can comprise a cascade controller. A third controller C can be provided as the first controller of the cascade controller. The third controller C can be a PI controller. The input variable of the third controller C can be the deviation $e_\delta$ of the target steering wheel angle $\delta_{target}$ from the actual steering wheel angle $\delta_{actual}$.

A fourth controller D can be provided as the second controller of the cascade controller. The fourth controller D can be a P controller. The input variable of the fourth controller D can be the deviation $e_{\dot{\delta}}$ of the actual steering wheel angle speed $\delta\hat{}_{actual}$ from the target steering wheel angle speed $\delta\hat{}_{actual}$. The actuating variable of the fourth controller D can be the target torque $M_{target}$.

In order to provide the driver with the optimum steering angle in the respective situation, a special steering support actuator 30 can be provided. The steering support actuator 30 can superimpose a torque corresponding to the torque $M_{target}$ over the steering angle/steering torque applied by the driver. The driver can perceive this as a pulling on the steering wheel in the direction of the target steering wheel angle $\delta_{target}$. By returning the actual steering wheel angle $\delta_{actual}$, the steering support actuator 30 can apply the superimposed torque until the driver has set the target steering angle $\delta_{target}$ or is no longer counter-steering. The superimposition of torque can occur before and/or after the torque reinforcement by the electromechanical servo steering. The superimposition is done by computer, for example in the EPS control device 26. The driver is thus guided by a haptic signal to the optimum avoidance trajectory. The superimposed torque and the superimposed change in torque are dimensioned such that they can be over-steered by the driver at any time.

The target values for guiding the vehicle along the avoidance trajectory can also be calculated on the basis of other criteria. For example, the lateral acceleration $a_y$ can be calculated with equation (12) below on the basis of the longitudinal speed v of the driver's own vehicle EGO and the curvature k of the avoidance trajectory. The curvature k, in turn, can be calculated using equation (13) from the first and second derivation of the avoidance trajectory following the course.

$$a_y = v^2 k \quad (12)$$

$$k = f''(x)/(1 + f'(x)^2)^{3/2} \quad (13)$$

A course angle $\lambda$ can be calculated using equation (14) on the basis of the first derivation of the avoidance trajectory following the course. The course rate $\lambda\hat{}$ can be calculated from the course angle $\lambda$ through derivation according to time (equation (15)), it being possible to use the calculated course rate $\lambda\hat{}$ as the target yaw rate.

$$\lambda = \tan^{-1}(f'(x)) \quad (14)$$

$$\lambda = d\lambda/dt = d\lambda/dx * dx/dt = (\tan^{-1}(f'(x)))'* v*\cos(\tan^{-1}(f'(x))) \quad (15)$$

Figure 7:
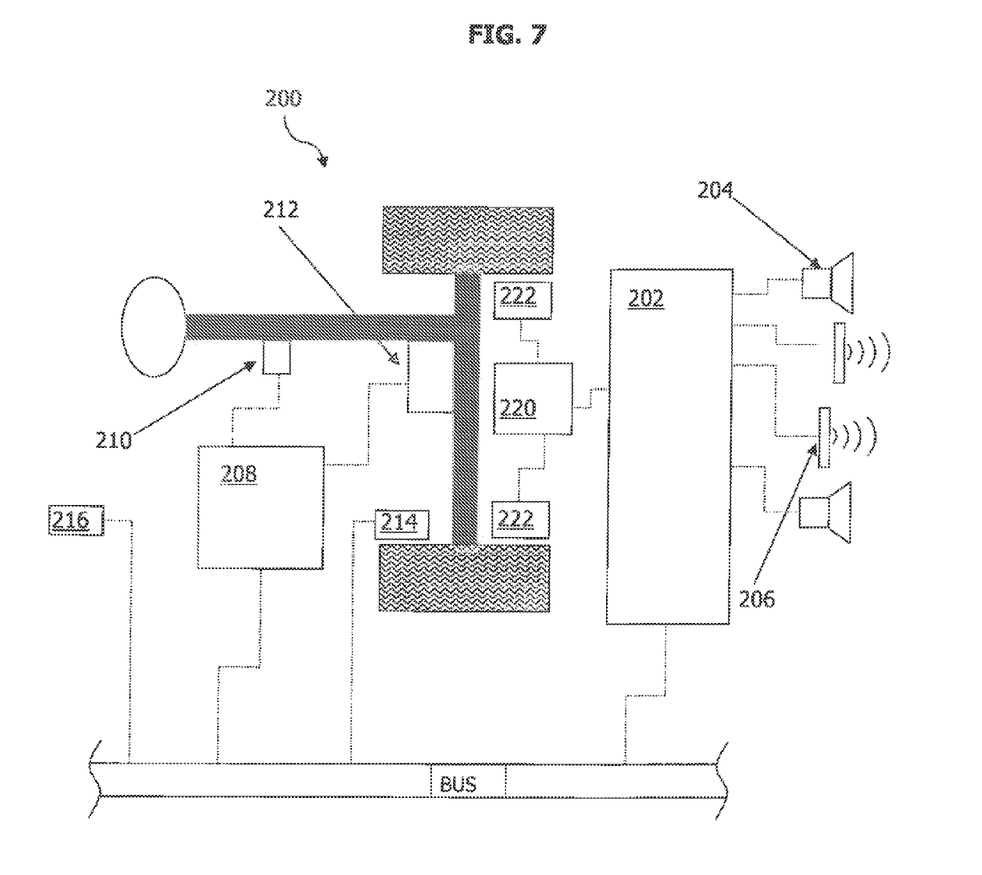
FIG. 7 is a schematic representation of a second exemplary embodiment of an avoidance support system.

FIG. 7 is a schematic representation of an alternative implementation of an ESA system 200. The difference between the ESA system 10 and the ESA system 200 is that no separate ESA control device 12 is provided.

Rather, the functionality of the ESA control device 12 is assigned to one or more control devices. For example, the corresponding functions can be assigned to an ACC control device (ACC: Adaptive Cruise Control), an FCW control device (FCW: Forward Collision Warning) or an AEB control device (AEB: Automatic Emergency Braking). An AEB control device 202 is illustrated for the sake of example in FIG. 7 that is connected to at least one camera 204 and/or at least one radar sensor 206. The AEB control device 202 is also connected to an EPS control device 208 which, in turn, is connected to a steering angle sensor 210 and to a steering support actuator 212. The AEB control device 202 is connected via a bus to at least one speed sensor 214 and to an acceleration sensor 216. Furthermore, the AEB control device 202 is connected to a brake control device 220. The brake control device 220 is connected to the wheel brakes 222.

In the exemplary embodiment illustrated in FIG. 7, the AEB control device 202 generates an environmental model. In addition, the AEB control device 202 can detect a collision hazard, calculate avoidance trajectories, and output a warning signal. The parameters of the calculated avoidance trajectories can then be outputted to the EPS control device 208.

The EPS control device 208 can identify the driver's desire to execute an evasive maneuver and support the evasive maneuver on the basis of the received parameters of the avoidance trajectories. The remaining functions of the EPS control device can be distributed to the AEB control device 202 and the EPS control device 208 depending on the respective implementation.

The environmental model generated by the AEB control device 202 can also be used for and by other driver assistance functions. For example, an adaptive speed control system, an automatic emergency braking function, and the emergency steering support can make use of a common environmental model. The AEB control device 202 can decide whether an emergency evasive maneuver or emergency braking is safer in the respective traffic situation. If the AEB control device 202 decides that an emergency evasive maneuver can be performed, the AEB control device 202 outputs appropriate control commands to the EPS control device 208. If avoidance proves not to be possible as a result of the traffic situation, the AEB control device 202 outputs appropriate control commands to the brake control device 220.

The variants of the control device, system and method described above are merely intended to convey a better understanding of the structure, the functionality and the characteristics of the control device, the system and the method; they do not limit the disclosure to the exemplary embodiments, for instance. The figures are partially schematic, and some essential characteristics and effects have been enlarged substantially in order to render dearer the functions, principles of action, technical designs and features. Every functionality, every principle, every technical design and every feature that is disclosed in the figures or in the text can be freely combined with all claims, every feature in the text and in the other figures, and other functionalities, principles, technical designs and features that are contained in this disclosure or follow therefrom, so that all conceivable combinations can be attributed to the described control device, the system and the method for supporting a driver in performing an evasive maneuver. Combinations between all of the Individual explanations in the text, that is, in every section of the description, in the claims and also combinations between different variants in the text, in the claims and figures are also included.

Nor do the claims limit the disclosure or the possibilities for combining all of the indicated features with one another.

All of the disclosed features are explicitly disclosed here both individually and in combination with all other features.

The invention claimed is:

1. A control device for a land vehicle, wherein the control device is set up to control at least one actuator of the land vehicle on the basis of an avoidance trajectory calculated by the control device in order to support a driver of the land vehicle during an evasive maneuver, the control device also being set up
    to receive sensor signals of at least one sensor;
    to generate an environmental model from the received sensor signals;
    to determine the position of an object relative to a current position of the driver's own vehicle in the generated environmental model; and
    to calculate a preliminary avoidance trajectory, wherein the current position of the driver's own vehicle in the environmental model constitutes the starting point of the preliminary avoidance trajectory,
    a preliminary end point of the preliminary avoidance trajectory being determined on the basis of the determined position of the object, and wherein
    at least the coordinates of the starting point and of the preliminary end point are used to determine the parameters of the preliminary avoidance trajectory,
    the control device also being set up to extend the preliminary avoidance trajectory by changing the coordinates of the preliminary end point in order to determine an optimized avoidance trajectory with a lesser curvature than the preliminary avoidance trajectory.

2. The control device as set forth in claim 1, wherein the extending of the preliminary avoidance trajectory comprises:
    shifting of the x-coordinates of the preliminary end point in the longitudinal direction of the vehicle;
    determining of at least one extended avoidance trajectory; distance to the object;
    continuing the extension by repeating the execution of the steps for the extended avoidance trajectory if the safety distance is maintained for the extended avoidance trajectory;
    aborting of the extension of the preliminary avoidance trajectory if the safety distance is not maintained, in which case the last extended avoidance trajectory in which the safety distance to the object is maintained is selected as the optimized avoidance trajectory.

3. The control device as set forth in claim 1, wherein the control device is set up to arrange the preliminary end point laterally next to a rear edge of the object.

4. The control device as set forth in claim 1, wherein the control device is set up to determine the x-coordinate of the preliminary end point in the longitudinal direction of the vehicle on the basis of the x-coordinate of an edge delimiting the object toward an open traffic space.

5. The control device as set forth in claim 1, wherein the control device is set up to determine the y-coordinate of the preliminary end point in the lateral direction of the vehicle on the basis of the road course in the area of the object contained in the environmental model.

6. The control device as set forth in claim 1, wherein the course of the avoidance trajectory corresponds to a fifth- or sixth-degree polynomial.

7. The control device as set forth in claim 1, wherein the control device is set up to use derivations of a polynomial following the course to determine the parameters of the preliminary avoidance trajectory.

8. The control device as set forth in claim 1, wherein the control device is set up to use the environmental model and/or the sensor signals to determine the parameters of the preliminary avoidance trajectory.

9. The control device as set forth in claim 1, wherein the control device is set up to determine target values for controlling the at least one actuator from the avoidance trajectory.

10. The control device as set forth in claim 1, wherein the control device is set up to calculate a new avoidance trajectory if actual values for the lateral offset, lateral speed, lateral acceleration and/or steering wheel angle lie outside of a tolerance range.

11. A steering support system for a land vehicle, comprising
 a control device as set forth in claim 1;
 at least one camera and/or at least one radar sensor; and
 a steering support actuator;
 the control device being set up
  to generate an environmental model on the basis of sensor signals received from the at least one camera and/or from the at least one radar sensor; and
  to control the at least one steering support actuator calculated by the control device in order to support a driver of the land vehicle during an evasive maneuver.

12. A method for calculating an avoidance trajectory for a steering support function of a and vehicle, comprising
 receiving of sensor signals of at least one sensor;
 generating an environmental model from the received sensor signals;
 determining the position of an object relative to the current position of the diver's own vehicle in the generated environmental model;
 calculating a preliminary avoidance trajectory, wherein the current position of the driver's own vehicle in the environmental model constitutes the starting point of the preliminary avoidance trajectory;
 a preliminary end point of the preliminary avoidance trajectory is determined from the determined position of the object,
 at least the coordinates of the starting point and of the preliminary end point are used to determine the parameters of the preliminary avoidance trajectory; and
 determining of an optimized avoidance trajectory with a lesser curvature than the preliminary avoidance trajectory through extension of the preliminary avoidance trajectory by changing the coordinates of the preliminary end point.

* * * * *

UNITED STATES PATENT AND TRADEMARK OFFICE
CERTIFICATE OF CORRECTION

PATENT NO. : 9,731,762 B2  
APPLICATION NO. : 14/895226  
DATED : August 15, 2017  
INVENTOR(S) : Carsten Hass et al.

Page 1 of 1

It is certified that error appears in the above-identified patent and that said Letters Patent is hereby corrected as shown below:

In the Claims

Column 20, Line 2 reads "and" should read --land--

Column 20, Line 7 reads "diver's" should read --driver's--

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*